Figure 1:
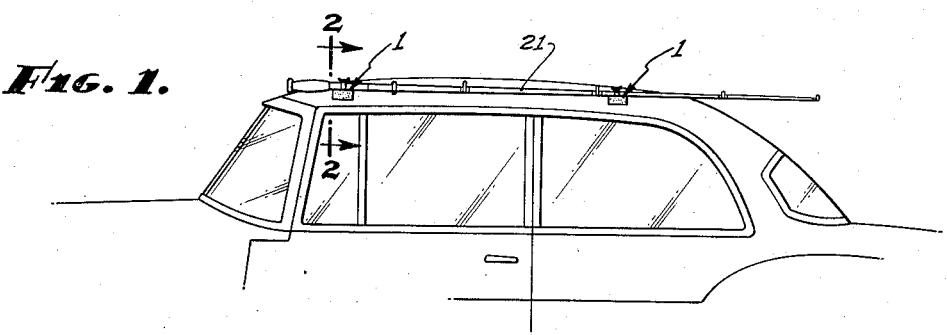

July 22, 1958     O. D. McPHEETERS     2,844,291
UTILITY CARRIERS
Filed May 14, 1956

OTIS D. McPHEETERS,
INVENTOR.

BY

United States Patent Office 2,844,291
Patented July 22, 1958

2,844,291
UTILITY CARRIERS
Otis D. McPheeters, Covina, Calif.
Application May 14, 1956, Serial No. 584,502
1 Claim. (Cl. 224—42.1)

The present invention relates to utility carriers.

At the present time, various articles are often carried by sportsmen on the top of a passenger automobile, such as fishing poles, skis, sleds, canoes, and other articles. Various means have been used for the automobiles to carry such articles, among which is the provision of transverse racks, either fixed to the automobile top, or detachably held thereto by suitable means, such as by straps, suction cups, and clamps. Most of such means are unsightly, difficult to install, liable to mar the finish of the automobile and, in the case of suction cups, liable to become loosened if the automobile strikes a rut, or if the work being carried should shift.

An object of my invention is the provision of a utility carrier so constructed and arranged as to hold tightly to any mangetic material without shifting, and which is readily placed in position of service and is easily removed and does not mar the automobile finish.

Other objects include a utility carrier which is of simple construction, inexpensive in cost of manufacture, and generally superior to carriers now known to the inventor.

With the above mentioned and other objects in view, the invention consists in the novel and useful provision, formation, construction, association, and relative arrangement of parts, members and features, all as shown in certain embodiments in the accompanying drawing, described generally, and more particularly pointed out in the claim.

Figure 2:
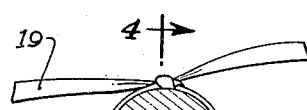
Figure 2:
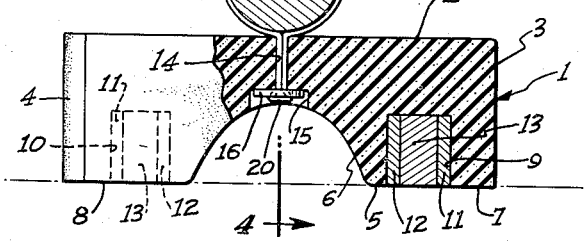
Figure 3:
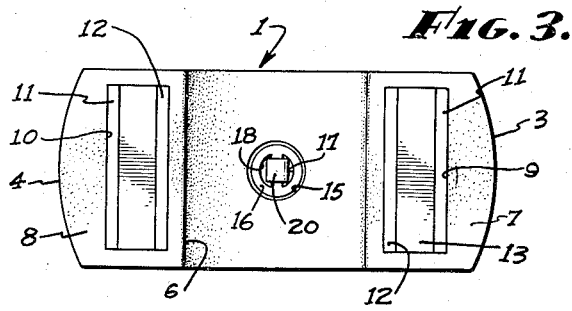
Figure 5:
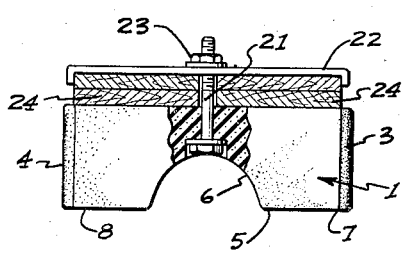
Figure 4:
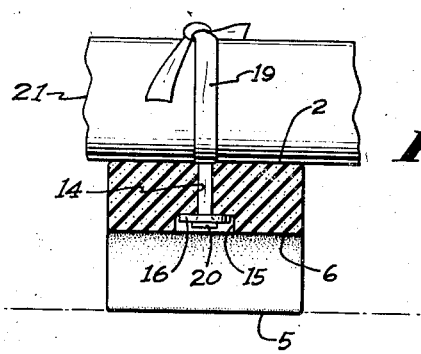

In the drawing:

Figure 1 is a fragmentary side elevation of a passenger vehicle showing use of the invention as a carrier for a fishing pole, Figure 2 is a sectional view on the line 2—2 of Figure 1, and on an enlarged scale, Figure 3 is a base view of the invention shown in Figure 2, Figure 4 is a fragmentary and partially sectional view on the line 4—4 of Figure 2, and Figure 5 is a fragmentary view of a slightly modified form of the invention.

Referring now with particularity to the drawing, and specifically to the form of the invention shown in Figures 2 to 4, inclusive, I provide a series of carriers designated generally as 1, and which include, in each instance, a body member 2 formed of some soft material, such as a sponge rubber, a flexible plastic, or other material, and which body, in the present instance, is substantially a rectangular parallelopiped although in the present instance, the ends 3 and 4 are of convex form, while the base 5 is provided with a transverse medial semi-circular concavity or channel 6. Extending inwardly from the base at portions 7 and 8 are transverse grooves or recesses 9 and 10. The grooves do not extend completely between the side walls of the body but provide pockets for insets. I provide a pair of soft ferrous members, which I term pole pieces, 11 and 12 in each pocket, and interposed between each pair of pole pieces is a magnet 13. The base edge of the pole pieces and of the magnet are substantially flush with the base surface of the body. As stated, the same arrangement is provided for the transverse groove or pocket 10 as provided for the pocket 9. I preferably use a permanent type magnet in each pocket interposed between the pairs of pole pieces, and the magnets 13 may be of any type, although I prefer either the well known or Alnico, or ceramic permanent magnets, known in the trade as Indox.

Centrally of the concavity 6, I provide a transverse bore 14 and counter-bore 15 which divides the concavity into quadrants. Within the counter-bore 15, I place a washer 16 having two spaced-apart half-round holes 17 and 18, and I thread a flexible tie 19 through and between the half-round holes, as shown at 20, and bring the ends of the tie upwardly, as see Figure 4. The tie constitutes one form of means for securing various items positioned on the top surface of the body 2. Thus, in Figure 1, I have shown my invention in cooperation with a fishing pole 20, and wherein I have provided two of the carriers 1 spaced apart longitudinally of a vehicle top, the ties securing the pole 20 between said members. Obviously, other articles may be secured between the carriers 1, such as shown in Figure 5, wherein in place of utilizing a tie, I pass a bolt 21 through the bore 14, and then provide an end flanged strip 22. The bolt carries the usual nut 23. Devices of this character differ from the form shown in Figures 2 and 4 in that the body may extend to a greater length than that shown in Figure 2, and the body is used to support various commodities, such as elongated lengths of piled lumber, designated as 24, between spaced pairs of carriers. The carrier body construction, with its permanent magnets and pole pieces, remains the same as just described for Figures 2 to 4.

In Figure 5, the lengths of lumber are stacked on the surface of the body on both sides of the bolt 21 and the strap 22 with its flanged ends secures the lumber in position, particularly when the nut 23 is tightened on the bolt threads.

The operation, uses and advantages of the invention just described are as follows:

By utilizing a magnet or magnets of great strength, and in spaced pairs, together with the soft iron or steel pole pieces on opposite sides of each magnet, and then placing the carriers against a ferrous body, such as the top of an automobile, as shown in Figure 1, the carriers are held against movement due to the magnetic flux which passes through the ferrous top of the automobile body from the pole pieces.

The body form is of importance, in that work carried thereby will not cause slippage or movement of the magnets and pole pieces when engaging a ferrous body due to downward deflection of the body. Thus, the weight of the pole, shown at 20 in Figure 2, may deflect downwardly the reduced area of the body due to the concavity without, however, disturbing the ends or foot portions of the body. The intermediate position of the tie 19 and its engagement with the work, is important in preventing deflection of the foot portions under load. In carrying larger loads of extended width, the arrangement shown in Figure 5, is of advantage as the flat lumber or other material, such as skis, extends over a considerable area of the top surface of the body without in any manner deflecting the body so as to loosen the magnets and pole pieces from engagement with the top of the vehicle.

I claim:

In a utility carrier, a resilient body having a top surface and a base surface, the said body on its base surface being transversely channeled intermediate its length to provide a pair of foot portions with each foot portion formed with a transverse recess extending inwardly from said base surface, pairs of spaced apart pole pieces in each recess, magnets interposed between said pairs of pole pieces, and means for securing work to the top surface of said resilient body, the said means being secured to said body intermediate its length and in the zone of said channel, said transverse channel being substantially semi-circular in form and said body being formed with a bore substantially dividing the semi-circular portion into quadrants, the said means for securing work comprising ties passed through said bore and secured to the body.

References Cited in the file of this patent

UNITED STATES PATENTS

| | | |
|---|---|---|
| 2,144,876 | Garnett | Jan. 24, 1939 |
| 2,240,035 | Catherall | Apr. 29, 1941 |
| 2,747,077 | Salm | May 22, 1950 |